United States Patent
Durant et al.

(10) Patent No.: US 11,814,475 B2
(45) Date of Patent: Nov. 14, 2023

(54) ASYMMETRIC AND SYMMETRIC MONOMER MIXTURES OF ESTERS OF ITACONIC ACID AND CORRESPONDING COPOLYMERS

(71) Applicant: Itaconix Corporation, Stratham, NH (US)

(72) Inventors: Yvon Durant, Lee, NH (US); Madeleine Eleanor Anderson, Deeside (GB)

(73) Assignee: ITACONIX CORPORATION, Stratham, NH (US)

( * ) Notice: Subject to any disclaimer, the term of this patent is extended or adjusted under 35 U.S.C. 154(b) by 22 days.

(21) Appl. No.: 17/643,541

(22) Filed: Dec. 9, 2021

(65) Prior Publication Data
US 2023/0183421 A1    Jun. 15, 2023

(51) Int. Cl.
*C08G 63/16* (2006.01)

(52) U.S. Cl.
CPC .................. *C08G 63/16* (2013.01)

(58) Field of Classification Search
CPC .... C08F 222/14; C08F 2800/20; C07C 67/03; C07C 69/593
See application file for complete search history.

(56) References Cited

U.S. PATENT DOCUMENTS

| | | | |
|---|---|---|---|
| 4,762,621 A | 8/1988 | Masler, III et al. | |
| 8,227,560 B2 | 7/2012 | Durant et al. | |
| 8,410,232 B2 | 4/2013 | Durant | |
| 2013/0065070 A1* | 3/2013 | Nabuurs | C08F 265/04 428/522 |
| 2016/0333127 A1* | 11/2016 | Durant | C08F 265/06 |
| 2019/0225830 A1* | 7/2019 | Xu | C08F 220/1802 |
| 2021/0008851 A1 | 1/2021 | Ekinaka | |

OTHER PUBLICATIONS

International Search Report and Written Opinion from corresponding PCT Appln. No. PCT/US2022/080039, dated Feb. 21, 2023.

Panic, V.V., et al. "Simple one-pot synthesis of fully bio-based unsaturated polyester resins based on itaconic acid", Biomacromolecules, Oct. 24, 2017.

Spasojevic, P., et al. "Optimization of Reactive Diluent for Bio-based Unsaturated Polyester Resin: A Rheological and Thermomechanical Study", Polymers 2021, 13, 2667, https://doi.org/10.3390/polym13162667.

Yadav, S.K., et al. "Recent advances in plant-based vinyl ester resins and reactive diluents", European Polymer Journal 98 (2018) 199-215.

Farmer, T.J., et al. "Synthesis of Unsaturated Polyester Resins from Various Bio-Derived Platform Molecules", Int. J. Mol Sci. 2015, 16, 14912-14932; doi:10.3390/ijms160714912.

Costa, C.S.M.F., et al. "Going greener: Synthesis of fully biobased unsaturated polyesters for styrene crosslinked resins with enhanced thermomechanical properties", eXPRESS Polymer Letters vol. 11, No. 11 (2017) 885-898, www.expresspolymlett.com https://doi.org/10.3144/expresspolymlett.2017.85.

Fidanovski, B.Z., et al. "Synthesis and characterization of fully bio-based unsaturated polyester resins". J Mater Sci (2018) 53:4635-4644.

Sakai et al., "Studies of the Isomerization of Unsaturated Carboxylic Acids. III. Thermal Rearrangement of Dimethyl Methylenesuccinate to Dimethyl Mesaconate", Bulletin of the Chemical Socity of Japan, vol. 50, No. 5, pp. 1232-1234 (1977), Japan.

Sakai et al., "Studies of the Isomerization of Unsaturated Carboxylic Acids. IV. Base-catalyzed Rearrangements of β, Y-Unsaturated Esters to a,β-Isomers", Bulletin of the Chemical Society of Japan, vol. 51, No. 10, pp. 2970-2972, 1978, Japan.

* cited by examiner

*Primary Examiner* — Robert C Boyle
(74) *Attorney, Agent, or Firm* — Grossman, Tucker, Perreault & Pfleger, PLLC

(57) ABSTRACT

A monomer mixture containing asymmetric and symmetric esters of itaconic acid which can be used as a reactive diluent. In addition, copolymers resulting from the polymerization of such monomer mixture. The monomer mixture more specifically includes the asymmetric monomers methyl ethyl itaconate (MEI) and ethyl methyl itaconate (EMI) and the symmetric monomers dimethyl itaconate (DMI) and diethyl itaconate (DEI).

20 Claims, 2 Drawing Sheets

ASYMMETRIC AND SYMMETRIC MONOMER MIXTURES OF ESTERS OF ITACONIC ACID AND CORRESPONDING COPOLYMERS

FIELD

The present invention is directed at a monomer mixture containing asymmetric and symmetric esters of itaconic acid which can be used as a reactive diluent. In addition, copolymers resulting from the polymerization of such monomer mixture. The monomer mixture more specifically includes the asymmetric monomers methyl ethyl itaconate (MEI) and ethyl methyl itaconate (EMI) and the symmetric monomers dimethyl itaconate (DMI) and diethyl itaconate (DEI).

BACKGROUND

U.S. Pat. No. 9,432,421 reports on the emulsion polymerization of esters of itaconic acid. In particular, the polymerization of itaconic acid containing ester functionality, for example, the alkyl esters of itaconic acid known as alkylitaconoate. An ester of itaconic acid polymer is produced via emulsion polymerization that contains greater than 50% by weight of an ester of itaconic acid along with a selected particle size and levels of molecular weight and tacticity.

U.S. Pat. No. 8,227,560 reports on methods and polymers based upon vinyl type monomers that contain pendant carboxylic acid groups and ester group functionality, such as the polymerization of itaconic acid.

U.S. Pat. No. 8,410,232 reports on esters of itaconic acid as suitable for polymerization in aqueous medium in the present of seed particles. The seed particles were indicated as absorbing the monomer and polymerizing to a desired particle size.

While efforts therefore have focused on formation of certain esters of itaconic acid, a need exists to provide a convenient esterification procedure for itaconic acid that would result in a mixture of asymmetric and symmetric esters of itaconic acid which upon polymerization provide a copolymer that may be beneficially utilized as a reactive diluent for curing of unsaturated polyesters.

SUMMARY

A mixture comprising asymmetric and symmetric monomeric esters of itaconic acid comprising methyl ethyl itaconate (MEI), ethyl methyl itaconate (EMI), dimethyl itaconate (DMI) and diethyl itaconate (DEI) having the following general structure:

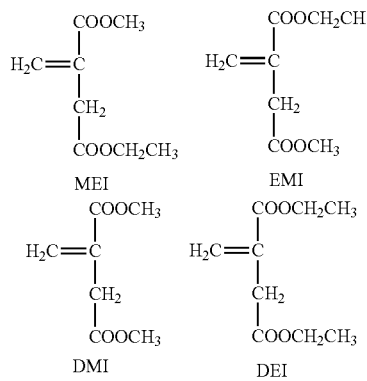

wherein MEI and EMI are present in an amount equal to or greater than 50.0% (wt.) to 98.0% (wt.) and DMI and DEI are present in an amount of 50.0% (wt.) to 2.0% (wt.), wherein the total amount of monomers present does not exceed 100.0% (wt.).

A random copolymer of esters of itaconic acid comprising the following structure:

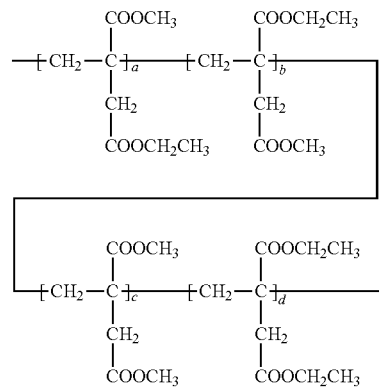

wherein repeat units "a" and "b" are present in an amount equal to or greater than 50.0% (wt.) to 98.0% (wt.) and repeat units "c" and "d" are present at a level of 50.0% (wt.) to 2.0% (wt.), wherein the total of repeat units "a", "b", "c" and "d" do not exceed 100.0% (wt.).

A method for curing an unsaturated polyester resin, comprising: (a) supplying an unsaturated polyester resin; (b) supplying a mixture comprising asymmetric and symmetric monomeric esters of itaconic acid comprising methyl ethyl itaconate (MEI), ethyl methyl itaconate (EMI), dimethyl itaconate (DMI) and diethyl itaconoate (DEI) having the following general structure:

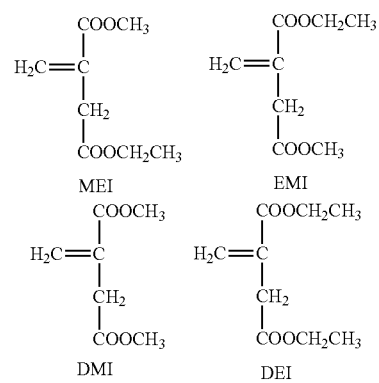

wherein MEI and EMI are present in an amount equal to or greater than 50.0% (wt.) to 98.0% (wt.) and DMI and DEI are present in an amount of 50.0% (wt.) to 2.0% (wt.), wherein the total amount of monomers present does not exceed 100.0% (wt.); and (c) curing the polyester resin.

DETAILED DESCRIPTION OF PREFERRED EMBODIMENTS

Figure 1:
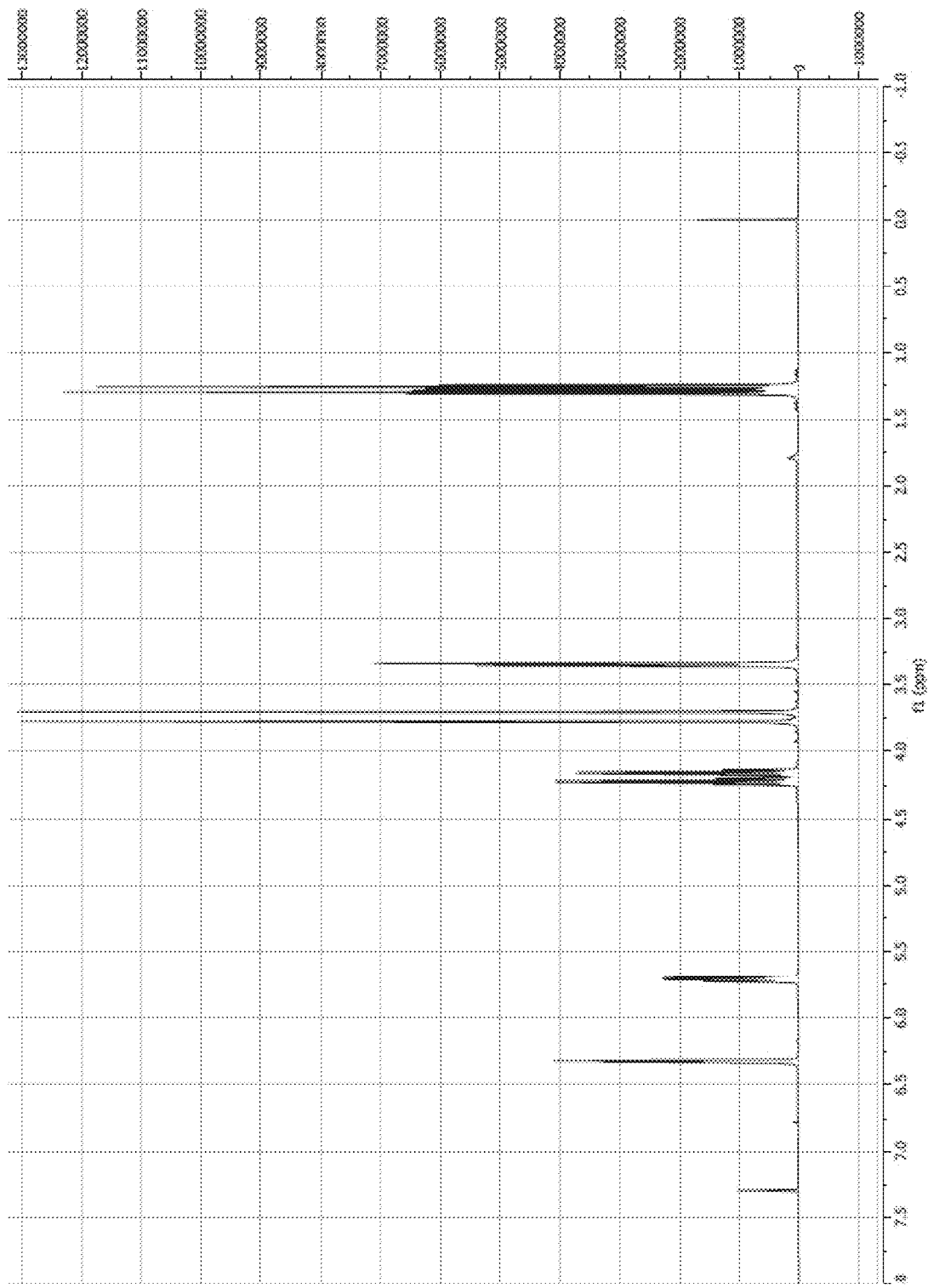
FIG. 1 is a proton NMR scan of the monomer mixture of Example 6.

As alluded to above, a preparation protocol is disclosed that provides asymmetric monomers of methyl ethyl itaconate (MEI) and ethyl methyl itaconate (EMI) with symmetric monomers of dimethyl itaconate (DMI) and diethyl itaconoate (DEI). Upon polymerization of this mixture of MEI, EMI, DMI and DEI, a copolymer resin is produced that has particular utility as a reactive diluent for curing (e.g., crosslinking) of unsaturated polyesters.

The structure of the four (4) monomer mixture of MEI, EMI, DMI and DEI is illustrated below:

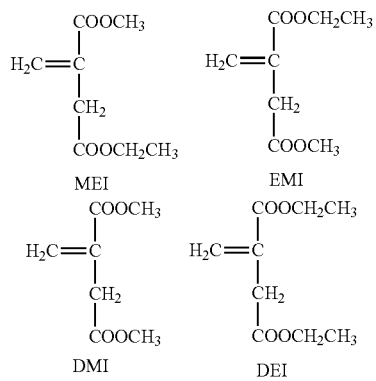

Preferably, the blend of the above asymmetric monomers is such that MEI and EMI are present in the four (4) monomer mixture in an amount of equal to or greater than 50.0% (wt.) to 98.0% (wt.), where the amount of MEI and EMI may vary. More preferably, the asymmetric monomers MEI and EMI in the four (4) monomer mixture are present in an amount of 50.0% (wt.) to 90.0% (wt.), or 50.0% (wt.) to 80.0% (wt.), 50.0% (wt.) to 70.0% (wt.) or 50.0% (wt.) to 60.0% (wt.). As noted below, the balance to 100% is then composed of DMI and DEI.

Moreover, there is preferably at least a minimum of 10.0% (wt.) of MEI with the balance being EMI, or there is at least a minimum of 10.0% (wt.) of EMI, with the balance being MEI. By way of example, one may preferably have at least 10.0% (wt.) of MEI and 40.0% to 88.0% (wt.) EMI. Or, one may preferably have 10.0% (wt.) of EMI and 40.0% (wt.) to 88.0% (wt.) MEI.

As alluded to above, the level of the two symmetric monomers DMI and DEI in the four (4) monomer mixture is such that they are in combination preferably present at a level of 50.0% (wt.) to 2.0% (wt.) or 50.0% (wt.) to 10.0% (wt), or 50.0% (wt.) to 20.0% (wt.) or 50.0% (wt.) to 30.0% (wt.) or 50.0% (wt.) to 40.0% (wt.), where the total amount of the four (4) monomers present does not exceed 100.0% by weight. For example, if 50.0% (wt.) to 60.0% (wt.) of MEI and EMI in combination are present, then the corresponding amount of DMI and DEI in combination can be 50.0% to 40.0%, wherein if one selects 55.0% (wt.) of a mixture of MEI and EMI, one can then select 45.0% (wt) of a mixture of DMI and DEI.

In addition, with respect to any of the aforementioned levels of the two symmetric monomers DMI and DEI, each are preferably present in equal amounts. For example, when the two symmetric monomers DMI and DEI are in combination present in the four (4) monomer mixture at a level of 50.0% (wt.), they are each individually and preferably present at a level of 25.0% (wt.).

It has also been observed herein that the four (4) monomer mixture herein is one that is susceptible to production with certain impurities. In particular, the impurities comprise non-reactive molecules such as methyl or ethyl esters of mesaconic acid which has the following structure:

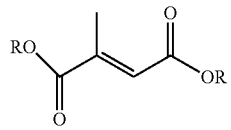

wherein R is independently either a methyl group or ethyl group. In addition, the impurities may comprise methyl or ethyl esters of citraconic acid, which has the following structure:

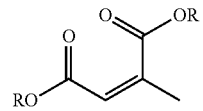

wherein R is again independently either a methyl group or ethyl group. Accordingly, the level of impurities of the methyl or ethyl esters of mesaconic acid and/or methyl or ethyl esters of citraconic is preferably maintained in the mixture of the four (4) monomers noted herein to a level of 0 to 10.0% (wt.), or 0 to 5.0% (wt.) or 0 to 2.5% (wt.) or 0 to 1.0% (wt).

It is now worth noting that upon polymerization of the above referenced four (4) monomer mixture, one may form a random copolymer of esters of itaconic acid having the following repeating units:

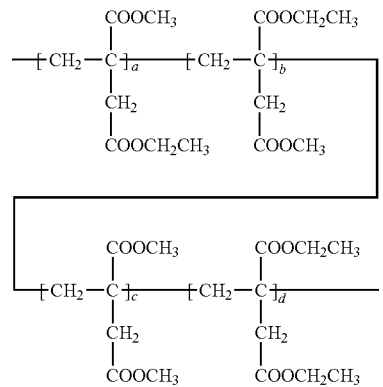

In the above, the copolymer composition preferably tracks the monomer feed composition. That is, asymmetric repeat units "a" and "b" are preferably present in an amount of equal to or greater than 50.0 wt. %, which respectively represent poly(methyl ethyl itaconate) (PMEI) and poly(ethyl methyl itaconate) (PEMI). More preferably, repeat units "a" and "b" are preferably present in the random copolymer at a level of equal to or greater than 50.0% (wt.) to 98.0% (wt), or 50.0% (wt.) to 90.0% (wt.), or 50.0% (wt.) to 80.0% (wt.), or 50.0% (wt.) to 70.0% (wt.) or 50.0% (wt.) to 60.0% (wt.), where the individual amount of PMEI and PEMI may vary, provided that in combination, the PMEI and PEMI composition falls within the indicated weight percentages in the random copolymer composition. Even more preferably, there is at least a minimum of 10.0% (wt.) of PMEI in the random copolymer or there is at least a minimum of 10.0% (wt.) of PEMI in the random copolymer.

Symmetric repeat units "c" and "d", which represent poly(dimethyl itaconate) (PDMI) and poly(diethyl itaconate) (PDEI) are in combination preferably present in the random copolymer at a level of 50.0% (wt.) to 2.0% (wt.), or 50.0% (wt.) to 10.0% (wt), or 50.0% (wt.) to 20.0% (wt.) or 50.0% (wt.) to 30.0% (wt.) or 50.0% (wt.) to 40.0% (wt.), wherein the total of repeat units "a", "b", "c" and "d" do not exceed 100.0% (wt.). More preferably, the random copolymer contains 1.0% (wt.) to 25.0% (wt.) of PDMI and 1.0% (wt.) to 25.0% (wt.) of PDEI.

As alluded to above, the random copolymer herein produced from the above reference four (4) component monomer composition is contemplated to have utility as a reactive diluent for the curing (e.g., crosslinking) of unsaturated polyester resins. Reference to an unsaturated polyester resin may be understood as reference to a polyester chain that includes one or more sites of residual unsaturation, namely a —C=C— type linkage, preferably between the ester linkages, an example of which is illustrated below, wherein R can be an alkyl group or aromatic group, and "n" is a variable number of repeating units. Reference to curing herein is understood as utilizing the four (4) component monomer composition herein to assist in the crosslinking of one or more selected polymer chains. Typically, such curing may be achieved by a free-radical polymerization, where one may preferably utilize organic peroxides such a methyl ethyl ketone peroxide.

The unsaturated polyester resin utilized herein may preferably have a number average molecular weight (Mn) in the range of 1,000 to 100,000, or 1,000 to 50,000, or 1,000 to 25,000.

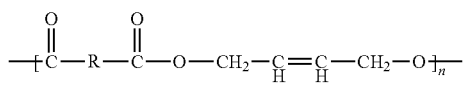

In such regard, it is worth noting that the monomer, DMI, on its own, is generally unstable, yet the four (4) component monomer composition herein, which includes DMI, does not show the storage instability of pure DMI. Furthermore, DMI when polymerized into homopolymer form, reportedly has a glass transition temperature (Tg) of about 100° C. The homopolymer of DEI, on the other hand, is reportedly around 56° C., which is relatively low for a suitable diluent and can adversely impact mechanical property performance versus temperature in the final cured polyester resin. Upon polymerization and formation of the random copolymer of the four (4) component monomer composition herein, one therefore again avoids the problem of the use of the unstable DMI, and a Tg above 56° C. can be achieved and a more effective reactive diluent for crosslinking of unsaturated polyester resins is provided. More specifically, it is contemplated that the random copolymer formed from the four (4) component monomer composition herein can be readily configured to preferably provide Tg values in the range of 75° C. to 85° C. That is, use of the random copolymer disclosed herein as a reactive diluent for an unsaturated polyester laminating resin is contemplated to provide a relatively stable monomer mixture derived from itaconic acid, an improved mechanical property performance versus temperature for the cured unsaturated polyester resin, particularly when such resin is fiber filled.

In addition, it is contemplated herein that the four (4) component monomer composition herein, derived from itaconic acid, may be combined with conventional reactive diluents for unsaturated polyester resins, such as vinyl type monomers (e.g. styrene, α-methyl styrene, acrylates, methyl methacrylate, methacrylates and/or vinyl toluene). For example, the four (4) component monomer composition herein may itself be combined and diluted with one or more of the vinyl type monomers noted herein, where the level of vinyl type monomer may itself then be present at a level of up to 50.0% (wt.) of the monomeric composition.

Working Examples

Example 1: To a round bottom flask reactor with a magnetic stirrer, a dean-stark condenser, was added: Itaconic Anhydride 112.8 gr, MEHQ 0.49 gr. Heat was set to 90 C with an electric mantel. Upon melting of the itaconic anhydride, 106.7 gr Ethanol and 2.7 gr MSA were slowly added. Then heat was set to 120 C, and 22.5 gr of Methanol was added. Then heat was set to 140 C, and 25 gr of Methanol was added. Then heat was set to 150 C, and 17 gr of Methanol was added. The resulting product was dark amber solution. Acid titration resulted in an acid number of 127 mg KOH/g. The resulting solution was washed twice with 200 gr of a 16% sodium carbonate solution. Analysis of the resulting mixture, after a carbonate solution wash to remove any acidic monomers, was performed by high pressure liquid chromatography (HPLC):

| Peak | Assignment | Proportion After Carbonate Solution Wash |
|---|---|---|
| 1 | Itaconic Acid | — |
| 2 | Mono Methyl Itaconate | — |
| 3 | Methyl Ethyl Itaconate | — |
| 4 | Di Methyl Itaconate | 34.6% |
| 5 | Ethyl Methyl Itaconate | 18.1% |
| 6 | Methyl Ethyl Itaconate | 32.9% |
| 7 | Di Ethyl Itaconate | 14.3% |

Example 2: To a round bottom flask reactor with a magnetic stirrer, a dean-stark condenser, was added: Itaconic Anhydride 56.02 gr, MEHQ 0.005 gr. Heat was set to 90 C with an electric mantel until the anhydride melted. Ethanol 24.6 gr was added slowly. Heat was then set to 120 C. Methanol 8 gr and MSA 0.6 gr were added. Then the temperature was increased to 140 C, followed by the addition of 8 gr of methanol. Then the temperature was increased to 150 C, followed by the addition of 5 gr of methanol. The resulting solution was washed twice with 100 gr of a 15% sodium carbonate solution. Analysis of the resulting mixture, after a carbonate solution wash to remove any acidic monomers, was performed by high pressure liquid chromatography (HPLC):

| Peak | Assignment | Proportion After Carbonate Solution Wash |
|---|---|---|
| 1 | Itaconic Acid | — |
| 2 | Mono Methyl Itaconate | — |
| 3 | Methyl Ethyl Itaconate | — |
| 4 | Di Methyl Itaconate | 32.0% |
| 5 | Ethyl Methyl Itaconate | 20.4% |
| 6 | Methyl Ethyl Itaconate | 31.0% |
| 7 | Di Ethyl Itaconate | 16.7% |

Example 3: To a round bottom flask reactor with a magnetic stirrer, a dean-stark condenser, was added: Itaconic Anhydride 56.12 gr, MEHQ 0.0062 gr. Heat was set to 90 C with an electric mantel until the anhydride melted. Methanol 16.5 gr were added slowly and kept for 90 minutes. Ethanol 24.08 gr and MSA 0.623 gr were added. Heat was then set to 120 C, then to 140 C. Ethanol 10 gr was added. Temperature was kept at 140 C until ebullition stopped. Analysis of the resulting mixture, after a carbonate solution wash to remove any acidic monomers, was performed by high pressure liquid chromatography (HPLC).

| 1 | Itaconic Acid | 10.0% | |
|---|---|---|---|
| 2 | Mono Methyl Itaconate | 24.0% | |
| 3 | Methyl Ethyl Itaconate | 20.4% | |
| 4 | Di Methyl Itaconate | 11.1% | 24.3% |
| 5 | Ethyl Methyl Itaconate | 11.3% | 24.8% |
| 6 | Methyl Ethyl Itaconate | 12.0% | 26.4% |
| 7 | Di Ethyl Itaconate | 11.2% | 24.5% |

Example 4: To a round bottom flask reactor with a magnetic stirrer, a dean-stark condenser, was added: Itaconic Anhydride 28.17 gr, MEHQ 0.0035 gr. Heat was set to 90 C with an electric mantel until the anhydride melted. Ethanol 5.75 gr and Methanol 4 gr were added slowly and kept for 60 minutes. Heat was then set to 120 C. Ethanol 3 gr, Methanol 2.1 gr and MSA 0.6 gr were added. Then the temperature was increased to 130 C. Analysis of the resulting mixture, after a carbonate solution wash to remove any acidic monomers, was performed by high pressure liquid chromatography (HPLC).

| Peak | Assignment | Proportions | Proportion After Carbonate Solution Wash |
|---|---|---|---|
| 1 | Itaconic Acid | 9.1% | — |
| 2 | Mono Methyl Itaconate | 26.5% | — |
| 3 | Methyl Ethyl Itaconate | 17.8% | — |
| 4 | Di Methyl Itaconate | 10.9% | 23.3% |
| 5 | Ethyl Methyl Itaconate | 19.1% | 40.8% |
| 6 | Methyl Ethyl Itaconate | 6.9% | 14.8% |
| 7 | Di Ethyl Itaconate | 9.8% | 21.1% |

Example 5—Polymerization: 2.194 gr of the alkyl itaconate mixture from Example 3 was mixed with 0.054 gr of azobisisobutyronitrile (AIBN) in a sealed glass vial, then heated to 60 C for 18 hours. The resulting polymer was clear and glassy. Molecular weight analysis by GPC provides a number average molecular weight of 9,453 g/mole and a weight average molecular weight of 16,970 g/mole.

Example 6: To a round bottom flask reactor with a magnetic stirrer, a dean-stark condenser, was added: Itaconic Acid 1133.68 gr, MEHQ 0.770 gr, methyl sulfonic acid 9 gr, methanol 280.54 gr and ethanol 402.5 gr. Heat was set to 100 C with an electric mantel for 2 hours. Then heat was increased to 120 C for 1 h 30 minutes. Then 70 gr of anhydrous methanol was added dropwise over 25 minutes. Then 630 torr vacuum was applied for 15 minutes. Then an additional 65 gr of methanol and 65 gr of ethanol were added dropwise over 2 hours under atmospheric conditions, followed by 600 ton of vacuum for 15 minutes. Then an additional 50 gr of methanol and 50 gr of ethanol were added dropwise under atmospheric conditions, followed by 600 ton of vacuum for 20 minutes. The resulting solution was washed twice with 100 gr of a 15% sodium carbonate solution at 80 C. 100.17 gr of the resulting solution was fractionated by vacuum distillation using a 20 cm packed column with ceramic Rashid rings mixed with 1 mm glass beads. A mid fraction was collected at column top temperature of 106.6 C to 109.7 C under 85-88 torr. HPLC analysis of this mid fraction resulted in the following composition.

| Peak | Assignment | Proportion After Carbonate Solution Wash |
|---|---|---|
| 1 | Itaconic Acid | — |
| 2 | Mono Methyl Itaconate | — |
| 3 | Mono Ethyl Itaconate | — |
| 4 | Di Methyl Itaconate | 23.4% |
| 5 | Ethyl Methyl Itaconate | 25.1% |
| 6 | Methyl Ethyl Itaconate | 28.9% |
| 7 | Di Ethyl Itaconate | 22.1% |

Figure 2:
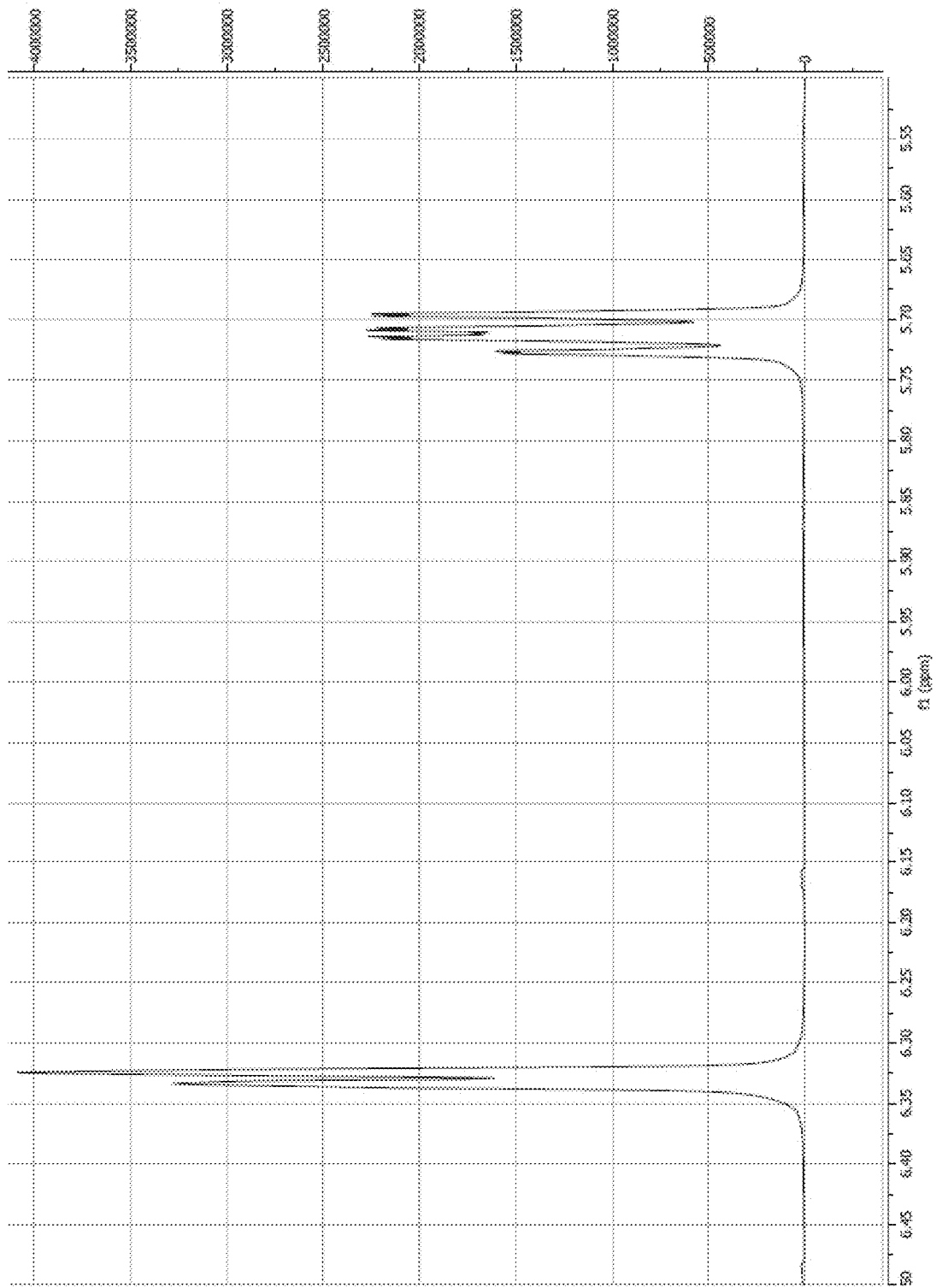
FIG. 2 is another proton NMR scan of the monomer mixture of Example 6.

NMR analysis of the mid fraction was also performed. Proton NMR of FIG. 1 revealed the essential absence of citraconate and mesaconate esters by the absence of peak between 5.75 ppm and 6.3 ppm. and absence of peak between 6.35 and 7.0 ppm respectively. "Essential absence" means no peak area greater than 1% with reference to area of the neighboring peak at 6.3-6.35 ppm representative of the vinylic proton. The same NMR spectra in FIG. 2 reveals a set of peaks at 5.65-5.75 ppm that have a structure of 4 very tight doublets. This chemical shift corresponds to the vinylic proton distal to the nearest carbonyl. The 4 peaks are proportional to the relative amounts of dimethyl itaconate, methyl ethyl itaconate, ethyl methyl itaconate and diethyl itaconate.

Performance Testing Methodology

Acid Number

This method provides a standard characterization of the residual amount of acid in an ester or polyester. This method is most suited for non-aqueous materials.

Solvent preparation: Prepare the solvent by mixing 2 parts toluene with 1 part anhydrous ethanol. Add 3 drops of phenolphthalein indicator (1% in ethanol) to solvent mix.

Sample preparation: Weigh 0.2 g of sample into titration beaker, add 40 g of solvent and mix until completely dissolved. Add 3 drops of Phenolphthalein indicator (1% in ethanol) to sample.

Titration of sample: Place the titration beaker with a magnetic stir bar on a stir plate and stir at a medium speed. Fill a burette with 0.1M KOH in ethanol and position the burette over the test solution. Begin titration by adding the titrant at a rate of approximately 1 mL/min with stirring, stop when sample turns pink for at least 10 seconds and record the volume of titrant used (V1).

Titration of blank sample: Run the titration method on the blank solvent and record titer (V2).

Calculations and Reporting for all Methods of Determination:

Acid Value (AV) Calculation $$AV = \frac{56.1*(V1-V2)*c}{m1}$$

where:
$V_1$=Volume in ml of KOH used to neutralize the test solution
$V_2$=Volume in ml of KOH used to neutralize blank determination
c=Concentration in moles per liter of the KOH solution
m1=Mass in grams of the test portion
56.1=Is a constant (molar mass of KOH in g/mol)

Molecular Weight Determination

Gel Permeation Chromatography (GPC) was used to determine molecular weights. The GPC is first equilibrated with the eluent (HPLC-grade Tetrahydrofuran—THF) through three VISCOTEK GPC columns (LT4000L, T2000 and LT5000L) for approximately one hour. A refractive index detector (RID) is used to measure signal concentration. The RID is purged for 20 minutes before sample analysis is started. The following instrument conditions are used: Eluent: HPLC-grade THF with inline degasser; Flow Rate: 1.0 mL/min; Run Time: 45 min; Injection volume: 100 µL; Draw/Eject Speed: 200 µL/min; RID Optics Temperature: 40° C.; Automatic Purge: 1 min; Column Temperature: 35° C.

A 1 wt. % polymer solution is prepared using the GPC eluent solution as solvent. This solution is filtered with a 0.204 syringe-tip filter into a 2 mL HPLC vial which is then crimped closed. The vial is placed into the GPC autosampler and the chromatographic run is initiated. Molecular weight calibration was done using 9 polystyrene standards with molecular weights ranging from 589 g/mole to 1,800,000 g/mole. The 9 standards were used to create a third order polynomial correlation between peak elution time and molecular weights. Each unknown sample is evaluated using this calibration function.

Determination of Monomer Composition

High Performance Liquid Chromatography (HPLC) was used to determine the composition. Reference elution times for Itaconic acid, dimethyl itaconate, diethyl itaconate were determined by using pure monomer. The HPLC ran in isocratic mode with an eluent composition of 80% of a 0.1 wt. % phosphoric acid aqueous solution and 20% acetonitrile through a reverse phase C18 column. A UV detector at 210 nm was used to measure signal concentration. The following instrument conditions are used: Flow Rate: 2.0 mL/min; Run Time: 14 min; Injection volume: 25 µL; Column Temperature: 23° C. Sample preparation included dilution to ~1% in acetonitrile and filtration with a 0.204 syringe-tip filter into a 2 mL HPLC vial which is then crimped closed. The following table represents the typical retention time of the reference itaconate, and the assignment to the 2 novel asymmetric esters. Retention may vary slightly over extended period of time, however the relative order of the peaks, and their relative space remains essentially the same.

| Peak | Retention time (minutes) | Assignment |
| --- | --- | --- |
| 1 | 1.6 | Itaconic Acid |
| 2 | 2.2 | Mono Methyl Itaconate |
| 3 | 3.0 | Mono Ethyl Itaconate |
| 4 | 3.7 | Di Methyl Itaconate |
| 5 | 6.1 | Ethyl Methyl Itaconate |
| 6 | 6.3 | Methyl Ethyl Itaconate |
| 7 | 10.1 | Di Ethyl Itaconate |

Proton NMR Analysis

The sample was dissolved in $CDCl_3$ and transferred to a 5 mm NMR tube. The sample was then analyzed on a Bruker BioSpin Avance NEO 500 MHz NMR spectrometer operating at a proton frequency of 499.7 MHz and equipped with a broadband iProbe model probe tuned to proton ($^1H$). Sample temperature was regulated at 25 C. A 1-dimensional single pulse experiment with a 30-degree excitation pulse (zg30) was run for a total of 16 scans with the receiver gain automatically adjusted by the TopSpin acquisition software. The relaxation delay was set to 1 second, acquisition time was 3.3 seconds, FID acquired size was 32K data points, and the spectral width was set to 10,000 Hz. Following acquisition, the data was imported into Mnova NMR processing software. After Fourier transform, the processed data contained 64K data points (one level of zero filling), and a 0.3 Hz exponential multiplier (line broadening) and $3^{rd}$ order Bernstein polynomial baseline correction were applied.

The foregoing description of several embodiments has been presented for purposes of illustration. It is not intended to be exhaustive or to limit the claims to the precise and/or preferred features disclosed and various modifications are possible in view of the disclosure herein.

The invention claimed is:

1. A mixture comprising asymmetric and symmetric monomeric esters of itaconic acid comprising methyl ethyl itaconate (MEI), ethyl methyl itaconate (EMI), dimethyl itaconate (DMI) and diethyl itaconate (DEI) having the following general structure:

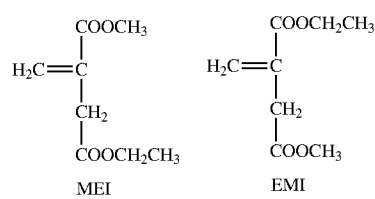

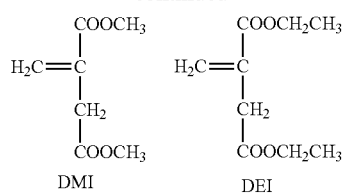

DMI   DEI wherein MEI and EMI are present in an amount equal to or greater than 50.0% (wt.) to 98.0% (wt.) and DMI and DEI are present in an amount of 50.0% (wt.) to 2.0% (wt.), wherein the total amount of monomers present does not exceed 100.0% (wt.).

2. The mixture of claim 1 wherein MEI and EMI are present in an amount of 50.0% (wt.) to 90.0% (wt.) and DMI and DEI are present at a level of 50.0% (wt.) to 10.0% (wt.).

3. The mixture of claim 1 wherein MEI and EMI are present in an amount of 50.0% (wt.) to 80.0% (wt.) and DMI and EMI are present at a level of 50.0% (wt.) to 20.0% (wt.).

4. The mixture of claim 1 wherein MEI and EMI are present in an amount of 50.0% (wt.) to 70.0% (wt.) and DMI and EMI are present at a level of 50.0% (wt.) to 30.0% (wt.).

5. The mixture of claim 1 wherein MEI and EMI are present in an amount of 50.0% (wt.) to 60.0% (wt.) and DMI and EMI are present at a level of 50.0% (wt.) to 40.0% (wt.).

6. The mixture of claim 1 wherein the mixture optionally includes methyl or ethyl esters of mesaconic acid having the following structure:

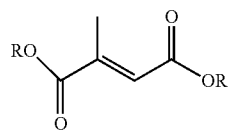

where R is independently either a methyl group or ethyl group, and wherein the methyl or ethyl ester of mesaconic acid is present at a level of 0 to 10.0% (wt.).

7. The mixture of claim 1 wherein the mixture optionally includes methyl or ethyl esters of citraconic acid having the following structure:

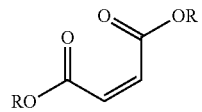

where R is independently either a methyl group or ethyl group, and wherein the methyl or ethyl ester of citraconic acid is present at a level of 0 to 10.0% (wt.).

8. The mixture of claim 1 further including a vinyl type monomer.

9. A random copolymer of esters of itaconic acid comprising the following structure:

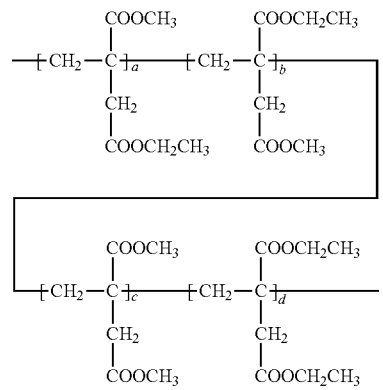

wherein repeat units "a" and "b" are present in an amount equal to or greater than 50.0% (wt.) to 98.0% (wt.) and repeat units "c" and "d" are present at a level of 50.0% (wt.) to 2.0% (wt.), wherein the total of repeat units "a", "b", "c" and "d" do not exceed 100.0% (wt.).

10. The random copolymer of claim 9 wherein repeat units "a" and "b" are present in an amount of 50.0% (wt.) to 90.0% (wt.) and repeat units "c" and "d" are present at a level of 50.0% (wt.) to 10.0% (wt.).

11. The random copolymer of claim 9 wherein repeat units "a" and "b" are present in an amount of 50.0% (wt.) to 80.0% (wt.) and repeat units "c" and "d" are present at a level of 50.0% (wt.) to 20.0% (wt.).

12. The random copolymer of claim 9 wherein repeat units "a" and "b" are present in an amount of 50.0% (wt.) to 70.0% (wt.) and repeat units "c" and "d" are present at a level of 50.0% (wt.) to 30.0% (wt.).

13. The random copolymer of claim 9 wherein repeat units "a" and "b" are present in an amount of 50.0% (wt.) to 60.0% (wt.) and repeat units "c" and "d" are present in an amount of 50.0% (wt.) to 40.0% (wt.).

14. A method for curing an unsaturated polyester resin, comprising:
   a. supplying an unsaturated polyester resin;
   b. supplying a mixture comprising asymmetric and symmetric monomeric esters of itaconic acid comprising methyl ethyl itaconate (MEI), ethyl methyl itaconate (EMI), dimethyl itaconate (DMI) and diethyl itaconoate (DEI) having the following general structure:

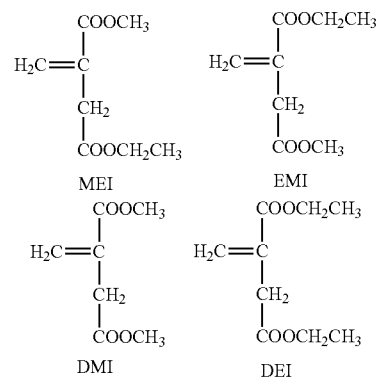

wherein MEI and EMI are present in an amount equal to or greater than 50.0% (wt.) to 98.0% (wt.) and DMI and DEI are present in an amount of 50.0% (wt.) to 2.0%

(wt.), wherein the total amount of monomers present does not exceed 100.0% (wt.); and c. curing the polyester resin.

15. The method of claim 14 wherein MEI and EMI are present in an amount of 50.0% (wt.) to 90.0% (wt.) and DMI and DEI are present at a level of 50.0% (wt.) to 10.0% (wt.).

16. The method of claim 14 wherein MEI and EMI are present in an amount of 50.0% (wt.) to 80.0% (wt.) and DMI and EMI are present at a level of 50.0% (wt.) to 20.0% (wt.).

17. The method of claim 14 wherein MEI and EMI are present in an amount of 50.0% (wt.) to 70.0% (wt.) and DMI and EMI are present at a level of 50.0% (wt.) to 30.0% (wt.).

18. The method of claim 14 wherein MEI and EMI are present in an amount of 50.0% (wt.) to 60.0% (wt.) and DMI and EMI are present at a level of 50.0% (wt.) to 40.0% (wt.).

19. The method of claim 14, further including a vinyl type monomer.

20. The method of claim 19, wherein said vinyl type monomer is selected from the group consisting of styrene, α-methyl styrene, acrylates, methyl methacrylate, methacrylates, and vinyl toluene.

* * * * *